United States Patent [19]

Arvanitakis

[11] 3,957,636

[45] May 18, 1976

[54] METHOD AND APPARATUS FOR LIQUID/SOLID SEPARATION

[76] Inventor: Kostas Savas Arvanitakis, 14945 S. Dogwood Ave., Orland Park, Ill. 60462

[22] Filed: Mar. 6, 1974

[21] Appl. No.: 448,493

[52] U.S. Cl. ................................. 210/67; 210/68; 210/75; 210/193
[51] Int. Cl.² .......................................... B01D 37/00
[58] Field of Search ............... 210/67, 68, 327, 75, 210/193, 167, 259, 332, 333

[56] References Cited
UNITED STATES PATENTS

| | | | |
|---|---|---|---|
| 2,681,153 | 6/1954 | Armbrust | 210/333 |
| 2,742,158 | 4/1956 | Schuller | 210/333 |
| 2,772,786 | 12/1956 | Gardes | 210/333 |
| 3,157,598 | 11/1964 | Rebiscoul | 210/332 |
| 3,297,163 | 1/1967 | Landon | 210/332 |
| 3,329,273 | 7/1967 | Martin | 210/332 |
| 3,360,869 | 1/1968 | Muller | 210/68 |
| 3,395,801 | 8/1968 | Muller | 210/68 |
| 3,416,668 | 12/1968 | Lobley | 210/327 |
| 3,478,885 | 11/1969 | Jackson | 210/327 |
| 3,482,693 | 12/1969 | Muller | 210/332 |
| 3,494,467 | 2/1970 | Paisley | 210/332 |
| 3,497,452 | 2/1970 | Arvanitakis | 210/75 |
| 3,637,079 | 1/1972 | Strub | 210/333 |
| 3,705,648 | 12/1972 | Arvanitakis | 210/259 |

Primary Examiner—Charles N. Hart
Assistant Examiner—Ernest G. Therkorn
Attorney, Agent, or Firm—August E. Roehrig, Jr.

[57] ABSTRACT

A method of and apparatus for clarifying contaminated liquid and/or recovering materials from a liquid utilizing horizontally disposed filter elements. Upon extending the filter cake or upon removing a predetermined amount of materials, the filter chamber is automatically drained of the liquid contained therein and the filter cake automatically removed from the supporting septum. Clarified liquid is recirculated through a precoat mixing chamber whereat filter aids are added to form a new filter cake on the filter elements. The expended filter cake containing the collected materials is removed from the filter chamber for disposal or further processing.

33 Claims, 6 Drawing Figures

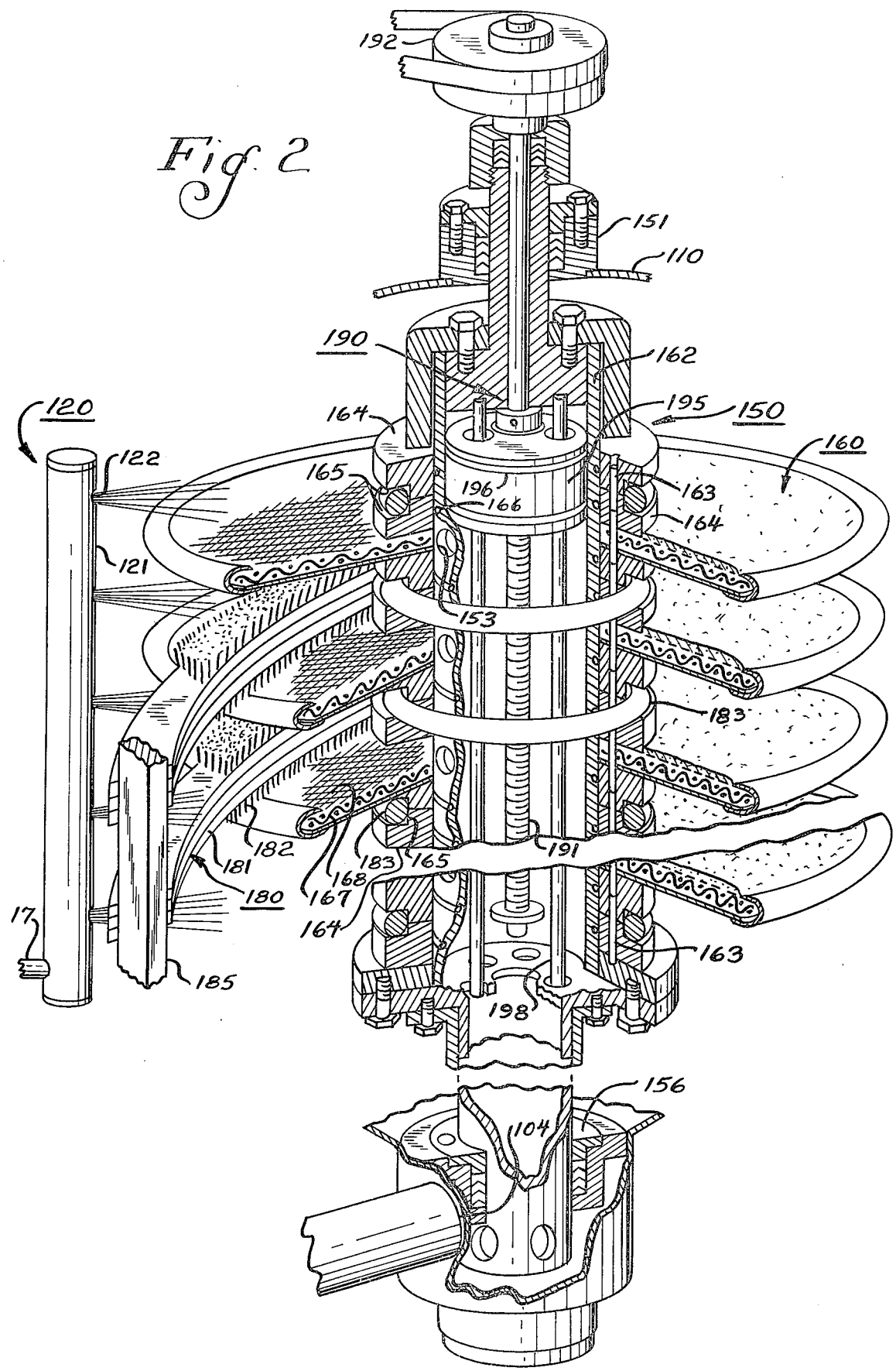

METHOD AND APPARATUS FOR LIQUID/SOLID SEPARATION

BACKGROUND OF THE INVENTION

This invention relates to an improved method of and apparatus for clarifying liquids and, in particular, to a filtration system utilizing horizontally disposed filters.

More specifically, this invention relates to a filtration system wherein horizontally disposed filter leaves, utilized to clarify a liquid, are automatically cleansed as required and supplied with new filter media for the continued operation thereof. Periodically the filter chamber is automatically drained and the expended filter media removed from the filter leaves for disposal or to recover the materials contained therein.

Clarification of liquids and/or the recovery of particulate materials from a liquid are required in many instances wherein it is desired to remove solid and/or chemical contaminants from the liquid prior to discharging the liquid, for example, into sewers. In other applications it is desired to recover materials suspended or dissolved in the liquid, such as the recovery of metals from solutions or the recovery of organic compounds in order to obtain desired constituents therefrom.

In certain other types of applications, it is necessary to recycle the liquid clarified by the filtration in order that it be continuously reused without discharge into sewage lines and/or subjected to costly methods of disposal. Due to requirements and regulations for environmental pollution control, or in other instances where the cost of the liquid is such that the disposal of the liquid would be uneconomical, the liquid must be recycled so that the filtrate can be continuously reused.

Various filtration systems have been developed for clarifying liquids by removing solid particles (whether initially dissolved or suspended therein) and chemical contaminants, as well as to recover reclaimable materials from the liquid. Certain of these systems employ mechanical screening devices utilized as a support for a chemically absorptive/adsorptive material such that the solid and the chemical contaminants are absorbed and-/or adsorbed on the surface of the filter. However, it has been found that as the contaminants are removed from the liquid they accumulate on the surface of the filter inhibiting the flow of the liquid therethrough, eventually clogging the filter and necessitating the removal of the filter cake from the filter septum. Another type of filtration system utilizes a disposable filter that upon becoming clogged is removed from the system and another replaceable filter inserted.

In those filtration systems wherein a filter cake is formed on the filter septum, various filter cleaning means, such as brushes, scrapers and/or sprayers are used to mechanically remove the filter cake from the filter septum, or screen. Another method employed to remove filter cake from the septum is by a backwashing action utilizing a reverse flow of filtrate through the filter. However, the backwashing of filtrate through the filter is detrimental to the filter and reduces its life considerably. Since most filters are constructed of a fine mesh screen septum supported solely on the low-pressure side by a support structure, this fine mesh screen distends and distorts easily when subjected to pressure from its low-pressure side.

Therefore, as previously indicated, the formation of the filter cake and its removal from the filter septum upon the accumulation of a predetermined amount of material from the liquid are important factors in the operation of all filtration systems.

Another important operational consideration for filtration systems is the orientation of the filter elements.

In certain applications vertically disposed filter leaves are utilized. While systems utilizing vertically disposed filters provide for ease of removal of filter cake from the septum upon the accumulation of material due to the assistance of gravity, it has been found that the vertical orientation of the leaves creates other problems. In applications wherein the flow rate of the liquid through the filter leaves is slow, the filter cake material has a tendency to prematurely fall from the septum. Therefore, in applications wherein the liquid flow rate is insufficient to create a pressure sufficient to hold the filter cake to the filter septum, a horizontally disposed filter must be utilized. In addition, the horizontal disposition of the filter not only prevents premature separation of the filter cake from the septum, but generally yields an improved filter cake in that during the coating or filter formation phase of operation a more uniform distribution of filter cake is formed on the septum. Furthermore, since the filter cake is formed in a horizontal position, imperfections in the cake such as cracks or holes are minimized.

In applications such as described above, a horizontally disposed filter leaf has many advantages over a filtration system wherein the filters are disposed vertically. However, since the horizontally disposed filter leaves are blind on the lowermost side, it is difficult to dispose of expended filter cake and replenish the filtration medium unless the entire contents of the filter chamber are drained causing a loss of the liquid and materials contained therein.

One type of prior art device employing a horizontally disposed filter rotates the filter leaves at a high rate of speed throwing the filter cake off the septum by centrifugal force. There are several disadvantages in this type of filtration apparatus in that the filter cake sometimes is strongly bonded to the filter septum such that upon the application of the centrifugal force the septum is ripped from the support materials along with the expended filter cake. In this event the filter must be shut down and the leaf replaced. In other instances, the filter cake is sufficiently bonded to the septum and the filter septum sufficiently secured to the support material such that the entire cake is not removed resulting in pieces of expended filter cake remaining attached to the septum which results in the formation of an uneven cake upon subsequent precoating.

Another disadvantage of prior art filtration systems utilizing horizontally disposed filters is that as the contents of the filter chamber are drained, an operator must control the draining of the filter chamber by sequentially closing valves connected to each of the filters. Since the lowermost portion of the filter leaf is blind, liquid will flow through the filter leaf and, as the liquid level is lowered, air will flow through the outlet of the uppermost leaf preventing the remaining liquid from draining from the tank. Therefore, an operator is required to sequentially close valves connected to each individual filter leaf to prevent air bleeding in order to enable the entire contents of the chamber to be withdrawn.

Since the utilization of the prior art filtering devices described above involves either difficulties in operation, such as maintaining a suitable precoat for filtration, or incurs substantial labor expense, none of these devices are completely satisfactory for general continuous operation of the filter apparatus and especially in those applications wherein it is extremely critical not to contaminant the filtrate once it has passed through the filtration system.

SUMMARY OF THE INVENTION

It is therefore, an object of this invention to improve filtration systems utilizing horizontally disposed filter media.

Another object of this invention is to improve the uniform formation of filter cake on the supporting septum.

Still another object of this invention is to collect materials from a liquid in an efficient and economical manner for further processing.

A further object of this invention is to automatically control the discharge of liquid from the filter chamber upon the removal of a predetermined amount of solids materials to facilitate the replenishing of the filter cake and the disposal or further treatment of the expended cake material.

These and other objects are attained in accordance with the present invention wherein there is provided a method of and apparatus for clarifying contaminated liquid and/or recovering materials from a liquid utilizing horizontally disposed filter elements. Upon extending the filter cake or upon removing a predetermined amount of materials, the filter chamber is automatically drained of the liquid contained therein and the filter cake automatically removed from the supporting septum. Clarified liquid is recirculated through a precoat mixing chamber whereat filter aids are added to form a new filter cake on the filter elements. The expended filter cake containing the collected materials is removed from the filter chamber for disposal or further processing.

DESCRIPTION OF THE DRAWINGS

Further objects of this invention, together with additional features contributing thereto and advantages accruing therefrom, will be apparent from the following description of one embodiment of the invention when read in conjunction with the accompanying drawings, wherein:

FIG. 2 is a frontal perspective view of the filter element assembly used to withdraw clarified fluid from the filter chamber and the apparatus for removing the expended filter cake from the filter septum;

DESCRIPTION OF A PREFERRED EMBODIMENT

Figure 1:
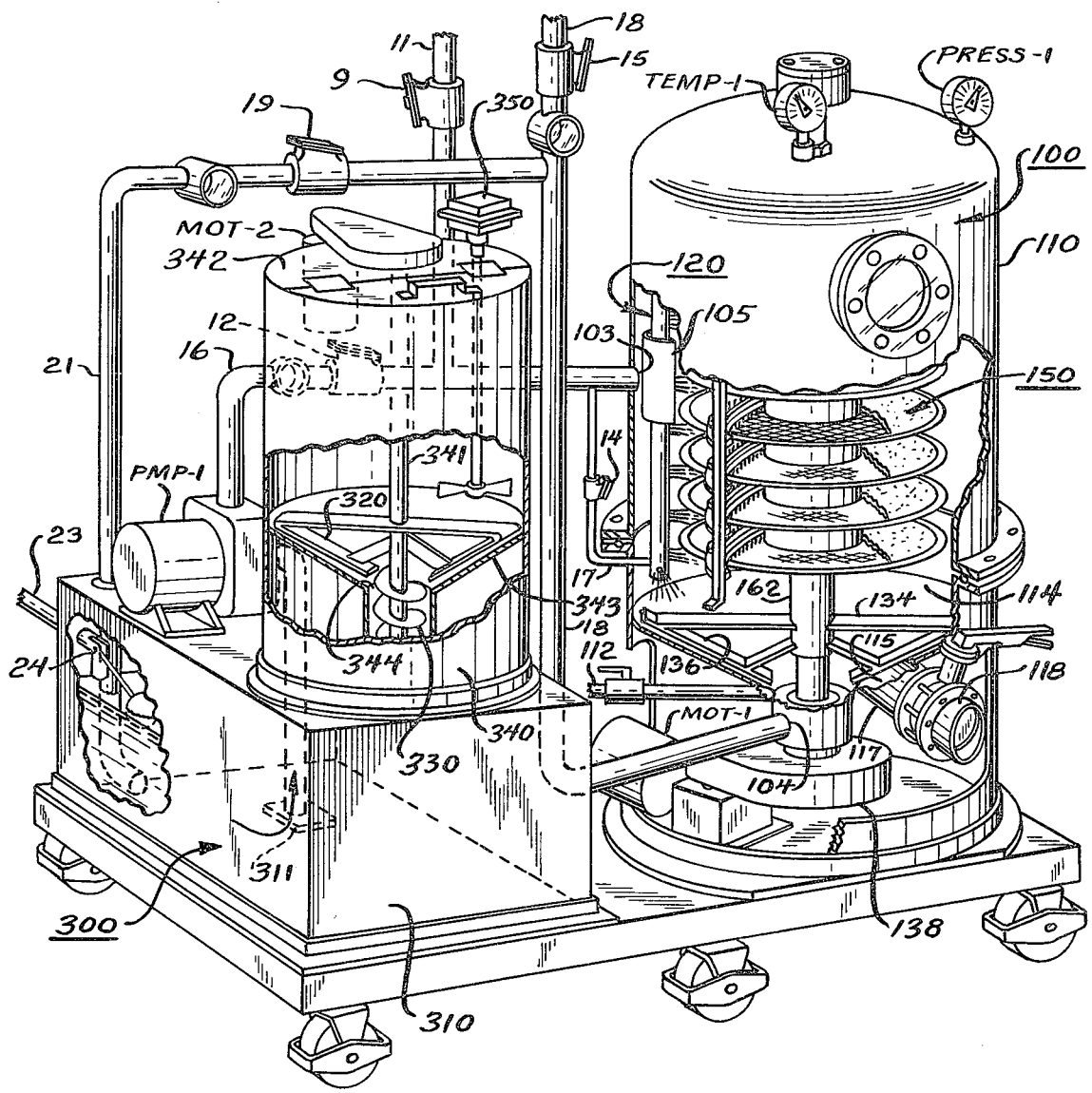
FIG. 1 is a perspective view of the invention with portions removed to better illustrate the components of the filtration system.

Referring now to FIG. 1, there is illustrated the overall filtration system which is the subject matter of this invention. The filtration system includes a horizontal filter mechanism 100 and a precoating appartus 300. Unclarified liquid is passed into the filter apparatus 100 through inlet line 11 into the inlet 103 of the filter chamber. A pneumatically controlled valve 12 insures that the flow of the unclarified liquid enters the filtration system 100 through the inlet 103 by preventing flow through line 16 when unclarified liquid is entering the system. Another pneumatic valve 14 is provided in line 17 to limit the flow into the filtration system 100 to the inlet opening 103 by closing off the spraying and flushing system hereinafter to be described in detail. A pump, now shown, which may be of any suitable commercially available type is utilized to pump the unclarified fluid through the inlet line 11.

The filter unit 100 includes a filter chamber 110 which is formed in two sections with the uppermost section being removably secured to the lowermost section to facilitate the servicing of the internal mechanisms. The liquid-tight bottom of the filter chamber is closed by a conical shaped member 114 appropriately secured within the filter chamber into which the unclarified liquid is delivered by means of the main pump. An outlet 115 is formed in the bottom of the cone and connected through a discharge pipe 117 to a discharge valve 118.

The unclarified liquid entering into the horizontal filter apparatus 100 is clarified by means of a horizontally disposed filter system 150 and passes out from the filter chamber 110 through the filter outlet 104, through line 18, to be reused, disposed of, or to be passed to the precoat system 300 depending upon the particular operational phase cycle in which the apparatus is operating which is to be hereinafter described in detail. The filter mechanism 150 includes a sealed hollow filter tube 162, rotatably mounted in sealed bearing housings 151 and 156 at the upper and lower ends, respectively, of the tube.

As best shown in FIG. 2, the filter tube 162 is sealed at both ends and has perforations 153 formed therein through which the clarified liquid passes to be discharged through the outlet 104. The filter elements 160 are mounted coaxially on filter tube 162 and separated one from the other by a plurality of spacers 164 such that the perforations 153 formed in the filter tube are in communication with the interior of the filter discs. "O"-ring seals 166 are appropriately carried in grooves formed in the filter tube to seal the spacers preventing any liquid from entering the filter tube except through the filter elements 160.

Each filter element 160 comprises a support structure or spacer 167 covered with a fine mesh screen or cloth septum 168. The support structure 167 may be a flat sheet of material folded in an accordian-like fold radiating outward from the center of the elements and tapering to a point at the outer edge or, as illustrated, a heavy gauge mesh. The fine mesh screen or cloth septum covering the support structure 167 is of a mesh size depending upon the size of the particular solid particles which are suspended in the liquid. The lowermost side of the filter elements 160 is a solid metallic plate such that the flow through the filter element is limited to one direction only, through the uppermost side of the filter element into its interior. The solid lower portion extends upwardly about the edge of the filter element to slightly overlap the septum and seal the outer periphery thereof, or a separate rim piece may be utilized for this purpose.

A plurality of wipers 180 are positioned between the filter elements 160 to clean the surfaces thereof as will be disclosed hereinafter in detail. The wipers 180 are each supported on a spacer 164 which separates the individual filter elements 160 of the filter mechanism so that each wiper is in contact with a face of adjacent filter elements. When the filter elements 160 are rotated, the wipers 180 are held stationary and the relative motion between the wipers and the filter elements 160 will cause the entire surface of the filter element to be subjected to the wiping action.

Each of the wiper elements 180 includes a curved arm portion 181 to which brush fibers 182 are appropriately secured. The wiper arm 181 extends radially outward in a curvilinear manner from its support ring 183. The spacers 164 are each supported coaxially upon the filter tube 162 and formed with complementary undercut portions 165 such that the undercut portions of opposed spacers form a channel to support the brush support rings 183 allowing the filter assembly 150 to rotate while the wiper elements are held stationary.

The curvilinear wiper arm 181 extends outward from the point at which it is tangentially secured to the support ring 183 beyond the outer periphery of the filter element 160. The curve is formed such that the filter cake removed from the septum will be subjected to an outwardly directed force (FIG. 6) as the filter elements 160 rotate against the brush. The rotation of the filter elements against the stationary brushes will remove cake from the septum and convey it outwardly until it is driven off of the filter element to fall to the bottom of the filter chamber. A brush stop 185 is appropriately secured to the inner walls of the filter chamber 110 to contact the arm portion 181 of the wiper to hold the brush stationary during rotation of the filter assembly 150.

The filter elements 160 are supported coaxially on the filter tube 162 by the spacers 164 and secured thereto by means of a series of pins 163 which interconnect each individual filter element 160 with the adjacent spacers 164. The spacers 164 are secured to the hollow filter tube 162 for rotation therewith, such that rotation of the filter tube 162 will rotate the filter elements 160. As previously described, the bottom of the filter tube 162 is sealed (156) to prevent the contents of the filter chamber 110 from passing through the outlet 104, except after having been filtered through the filter elements 160.

The lower portion of the filter tube 162 is connected through a drive system 138 to a motor MOT-1 appropriately secured to the base of the filter chamber. Upon energization of the motor MOT-1 the drive system 138 will effect rotation of the filter tube 162 thereby rotating the filter elements 160 against the wiper elements 180 which are held stationary against the brush stop 185. In this manner, the filter cake material supported on the septum 160 will be removed therefrom and forced outwardly on the filter elements to fall to the bottom 114 of the filter chamber.

As best shown in FIG. 1, the bottom of the filter chamber 110 is formed in a conical shape 114 and sealed to prevent liquid from passing out of the chamber except through the outlets 104 or 115 depending upon the particular phase of the operational cycle in which the apparatus is operating. A cone scraper 134 is secured to the filter tube 162 for rotation therewith and has end portions 136 extending substantially parallel to the conically shaped bottom 114. Since the sludge material removed from the filter septum of the filter elements 160 sometimes has tendency to accumulate at the cone, therefore, the cone scraper 134 functions to eliminate sludge bridging or build-up in the cone by insuring that the materials or sludge removed from the filter elements do not solidify or bridge within the chamber.

A piston assembly 190, whose function is to be hereinafter described in detail, is carried within the hollow portion of the filter tube 162 by means of a lead screw 191 rotatably carried within the filter tube 162 on appropriate bearing surfaces, and sealed to prevent any liquid from entering the interior of the filter tube. The lead screw is driven by means of a clutch assembly 192 connected to a suitable electric motor (not shown). Upon rotation of the lead screw 191 the piston 195 will be raised or lowered within the filter tube depending upon the direction of rotation of the lead screw. Rotation of the lead screw 191 to thereby raise or lower the piston 195, depending upon the direction of rotation, is independent of the drive motor MOT-1 which rotates the filter system 150. Disengagement of the clutch 192 allows the motor MOT-1 to drive the filter system 150 to freely rotate without moving the piston 195 carried within.

The piston 195 carries O-ring seals 196 to seal between the piston and the interior of the filter tube 162 preventing any liquid or air from passing between the inner wall of the filter tube and the outer surface of the piston 195. A pair of guide rods 198 are secured to the upper end of the filter tube 162 and at the lower end to prevent rotation of the piston 195 with the lead screw and are appropriately sealed 193 to prevent liquid or air from passing through the interior of the piston. Suitable seals 194 are provided to prevent liquid from passing between the inner portion of the piston and the threads of the lead screw 191, thereby insuring a complete fluid-tight sealing of the piston within the filter tube.

A spraying and flushing system 120 is supported within the filter chamber 110 and comprises a manifold 121 having a plurality of orifices 122 which function to direct a spray against each of the individual filter elements 160, the wipers 180 and the bottom of the chamber. The manifold 121 is connected to the inlet line by means of line 17 with a pneumatically controlled valve 14 connected in the line to control the flow of fluid through line 17 into the flushing system 120. The flushing system 120 is carried within the filter chamber 110 to discharge fluid against the filter elements after removal of the filter cake from the septum and the operation thereof will hereinafter be described in detail.

Referring again to FIG. 1, there is shown a precoat apparatus 300 having a mixing chamber 310 formed as a liquid-tight housing with a discharge outlet 311 or pump inlet to a pump PMP-1 having its discharge outlet connected to line 16. Since, in certain applications, such as a closed loop system, peridically a quantity of fluid must be added to the system to replenish fluid depleted through evaporation or during discharge of the expended filter cake materials, a make-up line 23 is connected to the mixing chamber 310 to provide make-up fluid from a source, not shown. A float valve 24 is carried within the mixing chamber 310 and functions to maintain a predetermined quantity of fluid within the chamber.

A filter aid hopper 340 is carried by the mixing chamber 310 and is formed as an enclosed container having a portion of the top hinged to replenish the contents thereof as they are depleted during operation of the filtration system. The bottom of the hopper 340 is formed in a conical shape 343 and secured within the hopper chamber to prevent any of the material contained therein from being discharged except through the outlet 344 in the bottom of the cone. The contents of the hopper 340 are discharged through the opening 344 in metered amounts as determined by operation of the feed auger 330 which is rotatably driven by a feeder drive motor MOT-2. The feed auger 330 is connected to the motor MOT-2 by means of a shaft 341 suitably journalled for rotation in brackets secured to the walls and top of the filter aid hopper 340. An agitator 320 is carried by the shaft 341 to rotate therewith to insure that the materials contained within the hopper 340 do not glomerate or form clumps within the hopper. An indicator device 350 is carried by the hopper 340 and provides a signal to indicate when the contents of the hopper have been depleted such that additional materials may be added.

When the feeder drive motor MOT-2 is energized, due to the gearing of the drive connection and the pitch of feed auger 300, a controlled pre-measured amount of filter aid media carried within the hopper 340 is dispensed into the mixing chamber 310. The materials added to the mixing chamber 310 form a slurry which is pumped through the feeder pump PMP-1 into the filter chamber 110 to pass through the filter elements 160 whereat the filter aids or media are retained on the filter septum 168 to precoat the septum thereby forming a new filter cake on the septum and allowing the clarified liquid to be recirculated through the mixing chamber 310.

Figure 4:
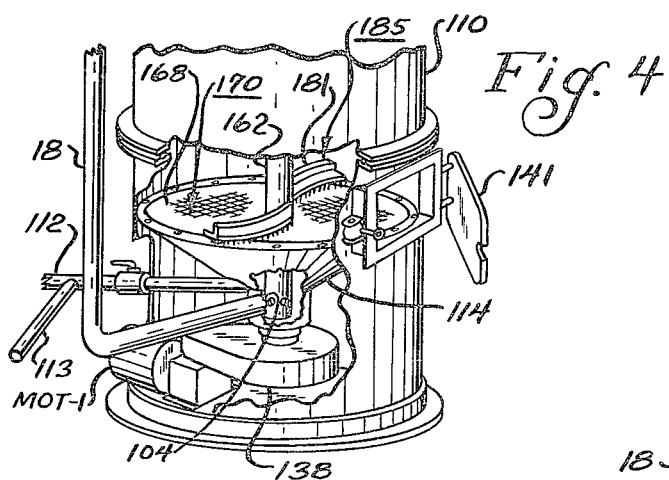
FIG. 4 is a perspective view of the bottom portion of the filter chamber to illustrate an alternative embodiment for clarifying the entire contents of the filter chamber.
Figure 5:
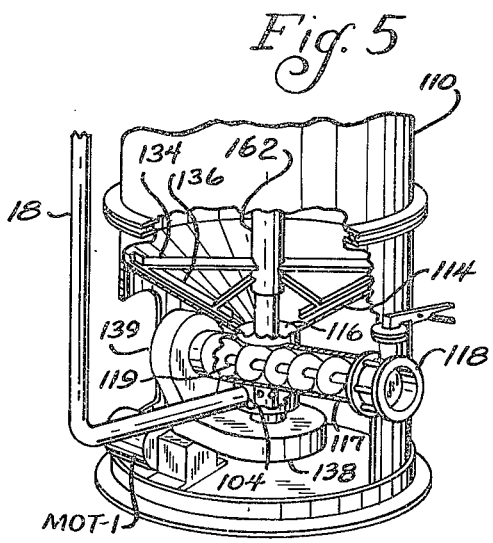
FIG. 5 is a perspective view of the lower portion of the filter chamber to illustrate yet another embodiment wherein there is provided apparatus for automatically conveying the expended filter materials from the chamber.

As shown in FIGS. 1, 4 and 5, the filter system 100 may have different configurations of the bottom portion of the chamber 110 depending upon the particular system application.

In the embodiment disclosed in FIG. 1, the bottom portion of the chamber 110 is formed as a water tight cone 114 having a cone scraper 134 carried adjacent thereto. Upon rotation of the filtration system 150 the cone scraper will be rotated with the portions 136, which extend parallel to the surface of the cone shaped bottom 114, rotating to insure that the materials removed from the filter elements do not bridge. After the system has been pressure drained through the filters 160, in a manner to be hereinafter described in detail, the discharge or drain line 112 is opened draining the remaining unclarified liquid from the chamber 110. When all of the unclarified liquid has been drained from the chamber the drive motor MOT-1 is energized rotating the filter elements 160 against the wipers 180 removing the filter cake material from the septum. At this time the cone scraper is also rotating insuring that the materials removed from the septum do not bridge within the cone. The discharge valve 118 is then opened manually and the semi-dry sludge or expended filter aid media is discharged through the valve for disposal.

With the embodiments shown in FIGS. 4 and 5, similar reference numerals indicate elements corresponding to that previously described with reference to the embodiment shown in FIG. 1.

Referring now to the embodiment shown in FIG. 4, this embodiment includes a bottom screen filter element 170 comprising filter cake supported on a fine mesh screen or cloth septum 168 secured to the uppermost portion of the cone shaped bottom 114. A bottom wiping element 185 includes curved arm portions 181 to which brush fibers 182 are appropriately secured. The wiper arms 181 extend radially outward from the point at which they are tangentially secured to the outer portion of the filter tube 162 beyond the outer periphery of the filter septum 168. The curved arm portions are formed such that the filter cake or expended materials removed from the filter element 160 and the filter cake carried by the lower element 170 will be subjected to an outwardly directed force conveying the materials to the outer periphery of the bottom screen.

In this embodiment the drain line 112 includes a recycle line 113 which is connected to the discharge line 18 or to the mixing chamber 310. At the end of the filtration process, the contents of the chamber 110 are pressure drained (to be described hereinafter) and upon drainage of the liquid within the chamber past the lowermost horizontal filter element 160, the outlet 104 is closed and the drain line 112 is opened to discharge the remaining liquid into the mixing chamber 310 or the return lines 18. In this manner, the entire contents of the filter chamber 110 are drained and reclaimed. A cleanout door 141 is then opened and motor MOT-1 energized removing the filter cake from the filter elements 160 and 170 such that these expended materials fall to the bottom screen 170 where they are conveyed out from the chamber through the cleanout door 141 in substantially a dry condition.

Referring now to the embodiment disclosed in FIG. 5, the chamber 110 is enclosed by a conically shaped bottom 114 with the edges 136 of a cone scraper 134 positioned adjacent thereto and connected to the filter tube 162 in the manner and for the purpose heretofore described. The outlet 104 is sealed to prevent any liquid from passing through the outlet 104 except after having passed through the filter elements 160. To this end an appropriate seal (not shown) is provided to prevent the liquid or any other material within the discharge outlet 116 from entering into the return line 18.

Positioned between the discharge outlet 116 of the cone bottom 114 and the sealed end of the cone discharge outlet is a horizontally disposed auger 119 appropriately journalled in suitable sealed bearings. The auger 119 is carried within a discharge tube 117 and positioned to receive all of the sludge or filter cake removed from the filter elements which settles to the cone shaped bottom 114 and is removed through the action of the cone scraper 136 to settle into the cone discharge outlet 116. A drive system 139 is coupled to the auger and to the motor MOT-1 such that upon actuation of the motor MOT-1 the filter elements are rotated removing the sludge and expended filter aid media from the filter elements 160 which settles to the bottom of the cone and passes out through the outlet 116 into the auger 119. Rotation of the auger will force the accumulating contaminants towards the discharge valve 118 steadily increasing the solids contents thereof forming a plug of sludge material adjacent the valve 118. The valve may be operated manually or semi-automatically such that upon opening the valve semi-dry sludge will be discharged and the valve is immediately closed as soon as liquid appears.

In this embodiment, the filter chamber 110 does not have to be drained each time that the expended filter cake is removed from the filter elements 160. Whenever it becomes necessary to replenish the filter cake material, the motor MOT-1 is energized, rotating the filter system 150 and the auger 119. The filter cake is removed from the filter elements 160 and passes into the auger 119. The contents of the filter chamber 110 are then utilized during the precoat cycle of operation such that any suspended materials in the chamber are mixed with new filter aid material to form a new filter cake on the filter elements 160. Periodically, the filter may be pressure drained and the remaining unclarified liquid discharged through valve 118.

In addition, the discharge valve 118 may be omitted or may be coupled to the vertical auger of a desludger apparatus such as discussed in U.S. Pat. No. 3,705,649 issued Dec. 12, 1972 to K. S. Arvanitakis if it is desired to provide an absolutely dry discharge. Reference is made to this patent to incorporate the disclosure therein.

The filtration system operation occurs through predetermined phase cycles clarifying liquid passed into the system and returning the liquid for further use or processing (referred to as the Filtration Cycle), a Discharge Cycle wherein the materials collected on or in the filter cake supported on the filter septum are removed from the septum and discharged from the chamber 110, and a Precoate Cycle wherein the filter septum is coated with filter aid material to return the unit to filtering operations. For a better understanding of this invention, these phase cycles of operation will be described in detail.

FILTRATION CYCLE

During the phase cycle of operation wherein the filtration system is clarifying liquid or recovering materials from the liquid, a pump (not shown) is activated pumping unclarified liquid through line 11 into the inlet 103 of the filter chamber 110. The pumping action of the pumps pressurizes the filter chamber 110, which is fabricated to form a pressure vessel, thereby forcing the unclarified fluid through the filter elements 160 and out the discharge outlet 104 via filter tube 162. At this time pneumatically actuated valves 12 and 14 are closed and 9 is open so that the liquid is discharged solely through the inlet 103 into the interior of the filter chamber 110. While operation of the valves disclosed herein is described as pneumatically controlled, these valves may be actuated by fluid pressure, or any other equivalent actuating device such as air or electrically operated solenoids. The unclarified liquid discharged into the filter chamber 110 is discharged against the turbulence supressor 105 and the liquid passes through the filter elements 160 into the interior of the hollow filter tube 162. At this time, the filter assembly 150 is stationary and the piston 195 is at its uppermost position.

The unclarified liquid is clarified by passing through the filter elements 160 and is withdrawn from the interior of the filter tube 162 through the outlet 104 and returned via line 18 to be reused, disposed of, or for further use. At this time, the drain line 112 as well as the discharge valve 118 are closed, pneumatically actuated valves 15 and 19 are open and closed, respectively, to limit the discharge of the clarified fluid solely to line 18. This filtration operation continues until such time as a predetermined amount of materials have been removed from the liquid onto or into the filter cake supported on the filter elements 160. As these materials are accumulated by the filter elements, restricting the passage of liquid therethrough, the pressure drop through the filter leaves increases until such time as a pressure sensitive switch is actuated which interrupts the transfer of unclarified fluid into the system. The system then enters the Discharge Cycle of operation in which the filter cake is removed from the septum and discharged from the filter chamber 110.

DISCHARGE CYCLE

After the predetermined amount of materials have accumulated on the filter element which is indicated by actuation of the pressure-sensitive switch, the system enters the Discharge Cycle. Pneumatically controlled valves 9, 12, 14 and 15 are are closed, as well as drain line 112 and discharge cone valve 118. Valve 19 remains open. Compressed air or gas is introduced into the filter chamber 110 by means of an air inlet, not shown, to pressurize the chamber. The increased pressure within the chamber 110 forces liquid through the filter elements 160, out the discharge outlet 104, through line 18, open valve 19, line 21 and into the mixing chamber 310.

After the liquid within the filter chamber 110 has drained until the uppermost filter element 160 is no longer submerged in liquid, the pressurized air or gas will pass through the filter cake drying the cake and into the hollow filter tube 162 causing a drop in the pressure with the result that liquid will no longer drain from the chamber 110. When the pressure decreases, a pressure-sensitive switch or flapper switch will detect air flow through the hollow filter tube 162 and actuate a motor and clutch 192 to rotate the lead screw 191 causing the piston 195 to move downward inside the hollow filter tube 162. As has been heretofore described in detail, the piston 195 is sealed with respect to guide rods 198, the lead screw 191, and the internal walls of the filter tube 162 such that upon the piston moving downward past the perforations 153 connecting the interior of the uppermost filter element with the interior of tube 162, the air passage will be blocked and the pressure will increase forcing the remaining liquid in the chamber 110 to be passed through the filter elements 160, into the internal portion of the tube 162, and out through the discharge outlet 104. Upon the increase of air pressure the pressure sensitive switch or flapper switch will be turned off deactivating the clutch mechanisms 192 and stopping the piston from further travel. This sequence, referred to as pressure draining, will continue with the liquid draining from the chamber 110 until air passes through the next set of perforations 153 again actuating the pressure-sensitive switch at which time the clutch 192 will again be energized driving the piston 195 downward until the perforations are sealed preventing air leakage. When the piston has reached its lowermost position, that is blocking the lowermost perforations 153 associated with the bottommost filter element 160, all of the filter cake material supported on the filter septum will be dried and the liquid within the chamber 110 will be drained to the level of the lowermost filter.

Depending upon the particular configuration of the filter unit (referring to the embodiments shown in FIGS. 1, 4, and 5) the Discharge Cycle will now vary with the particular embodiment employed. With the embodiment shown in FIG. 1, the drain line 112 is opened and the contents of the filter chamber remaining (the liquid below the lowermost leaf) is discarded. In this manner, a certain amount of the contaminated liquid is discarded along with the contaminants or materials contained therein. With this embodiment, the make up line 23 to mixing tank 310 is usually employed. After the contents have been completely drained from the filter chamber 110, the clutch 192 is again actuated to rotate lead screw 191 in a reverse direction to drive the piston 195 to its uppermose position, above the inlet from the uppermose filter element 160. With the piston 195 in its uppermost position and the entire contents of the chamber 110 drained, a motor MOT-1 is actuated which through drive system 138 rotates the filter system 150 causing the filter elements 160 to engage the wipers 180 whereby the filter cake is removed from the septum and conveyed outwardly where it falls to the bottom of the chamber into the cone 114.

Figure 6:
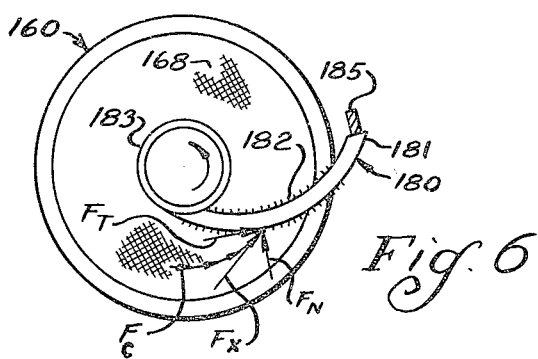
FIG. 6 is a top planar view of the apparatus for removing expended filter cake from the septum to better illustrate the operation thereof.
Figure 3:
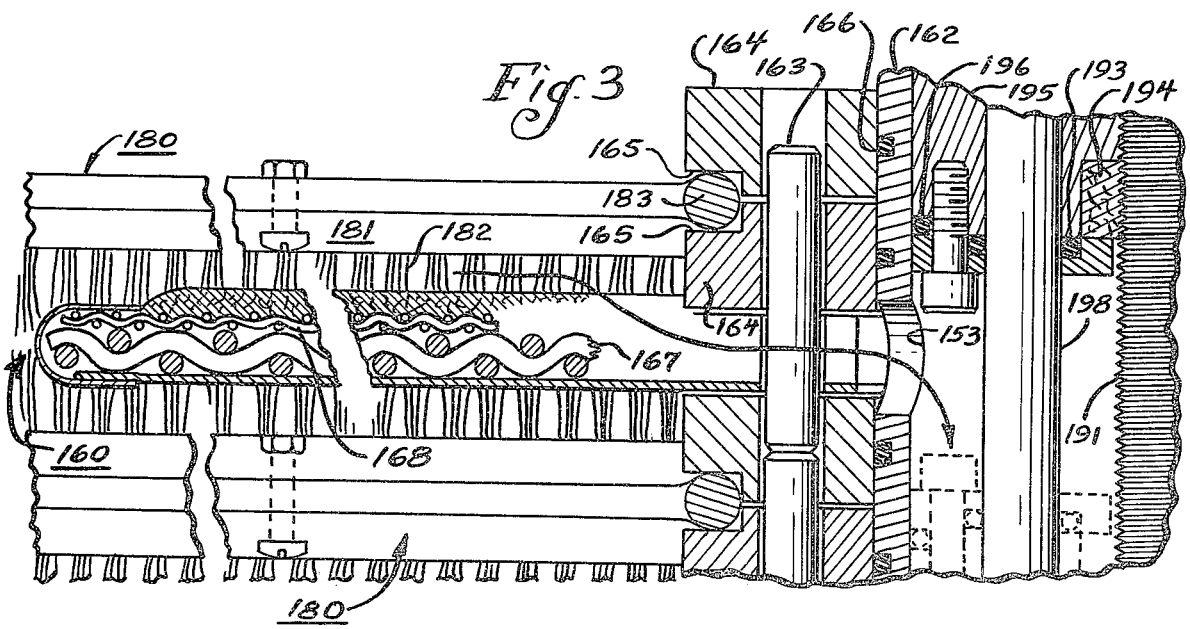
FIG. 3 is an enlarged sectional view of a portion of the filter element assembly used to withdraw clarified fluid from the filter chamber and the apparatus for removing the expended filter cake to better illustrate the features thereof.

Referring now to FIG. 6, there is illustrated a mechanical schematic of a filter element 160 and a wiper 180 to better illustrate the action of the curved brush against the filter cake material supported on the septum 168. As the filter element is rotated in the direction indicated by the arrow, the filter cake supported on the septum 168 will rotate and contact the wiper 180. For convenience of illustration a force vector $F_c$ is shown to indicate a unitary mass of the filter cake rotating into contact with the brush 180. The filter cake rotating into contact with the brush exerts a force on the brush which is applied to the brush at a point tangential to a radius extending from the center of rotation of the filter 160 and is illustrated by $F_x$. This force is then differentiated into the force vectors applied normally and tangentially to the brush producing the outwardly directed force vectors $F_n$ and $F_t$ which are directed outwardly and, in effect, remove the filter cake from the filter elements 160.

The cone scraper 134, which rotates with the filter system 150, insures that the materials removed from the filter elements 160 do not bridge within the bottom, but are conveyed through the outlet 115 of the discharge tube 117 to be discharged through the cone valve 118. After the entire filter elements 160 have been subjected to the wiping elements 180, the filter cake removed from the septum, and the expended materials discharged through the discharge valve 118, the pump motor PMP-1 is energized. Pneumatic valves 12 and 14 are now opened and the contents of the mixing chamber 310 (which is clarified liquid) are pumped into the filter chamber 110 and through the spraying system 120. The spray system 120 directs a spray against each of the filter elements 160 to flush the filter element and the brushes removing any particles of filter cake from these elements. After the spraying system has sufficiently cleansed or flushed the filter elements 160 and the brushes 180 the filter system 150 is then ready to have a new coating of filter aid material formed on the septum of the filter elements 160 in preparation for returning to the filtration phase.

The embodiments shown in FIGS. 4 and 5 utilize the same operation and/or phase cycle sequence for the Filtration cycle as previously disclosed, and the Precoate Cycle, to be hereinafter disclosed, but differ in operation from the embodiment shown in FIG. 1 during the Discharge Cycle of the system operation.

Referring to the embodiment shown in FIG. 4, the sequence of introducing pressurized air into the filter chamber 110 and sequentially moving the piston 195 downward until all of the liquid had been drained through the lowermost filter element (referred to as pressurized draining) is the same. However, when the piston reaches the bottom of the lowermost rotation filter element 160, drain line 112 is opened, outlet 104 is closed, and the remaining contents are pressure filtered through the lowermost filter element or bottom screen 170 to be returned to the mixing chamber 310 and drying all of the filter cake. After the entire contents have been drained the motor MOT-1 is energized and the filtration system is rotated with the filter elements 160 being subjected to the wiping action of the brushing elements 180. The lower brush 185 removes the expended filter cake from the lower filter element 170. As the filter cake material is removed from the leaves 160 and falls to the bottom or filter element 170, the brush 185 conveys this material out of the chamber 110 through the discharge door 141. In this manner, the entire contents are swept out of the filter chamber 110 while the entire liquid contents of the chamber are reclaimed. The spraying and flushing system 120 is then actuated as heretofore described.

Referring now to the embodiment illustrated in FIG. 5, the filter chamber 110 is not drained each time it becomes necessary to replenish the expended filter cake. While the position of the pneumatically controlled valves is the same as previously described, the motor MOT-1 is energized while the chamber 110 is full of liquid. The filter elements 160 are scraped and the sludge or expended filter cake material gravitationally settles to the cone shaped bottom 114 whereat it passes through the discharge outlet 116 into the horizontal auger 119. The rotation of the horizontal auger 119 forces the sludge materials to the discharge end thereof whereat the action of the auger 119 against the closed discharge valve 118 forms a plug of these materials by the auger 119 continually compressing these materials against the valve 118. The sludge is then expelled through the discharge valve 118 with the discharge valve being closed as soon as any liquid appears. At periodic intervals the apparatus may go through a discharge cycle as described with reference to the embodiment disclosed in FIG. 1 with the valve 118 being opened manually while the motor MOT-1 drives the auger and cone scraper to completely clean the unit.

PRECOAT CYCLE

After all of the expended filter cake has been removed from the filter elements and the exposed septum and brushes have been thoroughly flushed by the spraying system 120, the unit is ready to have a new filter cake formed on the filter elements. Pneumatically controlled valves 9, 14, and 15 are closed, as well as drain line 112 and the discharge valve. Valves 12 and 19, as well as outlet 104 are opened to form a path of circulation from the mixing chamber 310, into the filter chamber 110, through the filter elements and out of the discharge outlet 104 to be returned to the mixing chamber 310. The sealed piston 195 is at its uppermost position above the uppermost inlet 153 of the filter tube 162, and the filter chamber 110 is filled with fluid.

A predetermined quantity of filter aid material is dispensed into the mixing chamber 310 by means of the feed auger 330 of the filter aid hopper 340. To this end the motor MOT-2 is energized for a predetermined time until this quantity of material has been added into the contents of the mixing chamber 310 forming a slurry therewith which is pumped by actuation of the pump PMP-1 through the outlet line 16 into the filter chamber 110. This slurry passes through the filter elements 160 (and 170 if used) gradually forming a new coat of filter aid material on the septum thereof with the liquid returning through the hollow filter tube 162 out of the discharge outlet 104 to be returned through line 21 into the mixing chamber. This process continues until all of the filter aid material added into the chamber 310 has been deposited on the filter elements. The liquid then remaining in the system would be clarified with all of the filter aid media being contained by the filter elements. The apparatus is now ready to again enter the Filtration Cycle of operation.

Upon completion of the precoat cycle, valves 12, 14, and 19, drain line 112, and cone valve 118 remain closed. Valves 9 and 15 are opened such that the path of liquid flow is through the inlet line 11, into the chamber 110, through discharge inlet 103, through the filter elements 160, into the internal portion of the filter tube 162, out the discharge outlet 104, and through line 18 as previously described. The filter remains in the filtration cycle until such time as materials accumulate on or in the filter elements 160 to a level sufficient to initiate the discharge phase of the operational cycle.

While the invention has been described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is indended that the invention not be limited to the particular embodiments disclosed as the best mode contemplated for carrying out this invention, but that the invention will include all embodiments falling within the scope of the appended claims.

What is claimed is:

1. A method of removing materials from an unclarified liquid and reclaiming the liquid and/or materials comprising the steps of
    passing unclarified liquid into a filter chamber and through a horizontally disposed filter cake bearing filter having a discharge outlet thereby removing the materials from the liquid and accumulating the materials on the filter cake,
    discharging the liquid clarified thereby from the filter chamber,
    interrupting the passing of unclarified liquid through the filter and interrupting the discharging of the clarified liquid in response to accumulating a predetermined amount of material on the filter cake,
    pressurizing the filter chamber forcing liquid remaining in the chamber through the filter,
    pressure draining the portion of the unclarified liquid in the chamber located above the level of the discharge outlet of the filter element through the filter while retaining the portion of the unclarified liquid within the chamber,
    interrupting the pressure draining of liquid from the filter chamber by passing the pressurizing medium through the filter,
    drying the filter cake by passing the pressurizing medium therethrough, and
    removing the filter cake from the filter and the filter chamber.

2. The method of claim 1 further including the steps of
    refilling the filter chamber with liquid,
    adding a quantity of filter cake forming material to the liquid, and
    circulating the liquid and filter cake forming material through the filter forming a new filter cake thereon.

3. The method of claim 1 wherein the step of interrupting passing of unclarified liquid through the filter and the discharging of the clarified liquid in response to accumulating a predetermined amount of material on the filter cake is in response to the sensing of a predetermined pressure drop through the filter.

4. The method of claim 1 wherein the step of pressurizing the filter chamber forcing liquid remaining in the chamber through the filter comprises introducing a gaseous medium into the filter chamber.

5. The method of claim 1 wherein the step of removing the filter cake from the filter comprises brushing the outer surface of the filter thereby removing the filter cake and conveying it therefrom.

6. The method of claim 1 further including the step of spraying the filter with clarified liquid subsequent to removing the filter cake from the filter and conveying the removed filter cake from the filter chamber to provide complete flushing.

7. The method of claim 1 wherein the step of interrupting the passing of pressurizing medium through the filter includes forming an air-tight seal preventing the pressurizing medium from passing through the filter.

8. The method of claim 1 wherein the step of removing the filter cake from the filter comprises rotating the filter against a stationary brush.

9. The method of claim 1 wherein the step of removing the filter cake from the filter chamber comprises draining any remaining liquid from the filter chamber carrying therewith the filter cake removed from the filter.

10. The method of claim 1 wherein the step of removing the filter cake from the filter chamber comprises
    gravitationally conveying the filter cake to a horizontally disposed auger means in communication therewith,
    advancing the removed filter cake in said auger means compressing the removed filter cake at the end thereof forming a semi-dry plug.

11. The method of claim 10 further including periodically discharging a portion of the filter cake plug formed at the end of the auger means.

12. The method of claim 11 further including passing the filter cake plug discharged at the end of said auger means into a heated vertically disposed auger means having at least a portion of the flight of said vertically disposed auger means removed at a position above the point of entrance of the filter cake thereto, and
    heating the filter cake in the vertically-disposed auger means to vaporize at least a portion of the liquid in said filter cake, elevating the heated filter cake in said auger means, and discharging substantially dry filter cake at the end thereof.

13. A method of removing materials from an unclarified liquid and reclaiming the liquid and/or materials comprising the steps of passing unclarified liquid into a filter chamber and through a plurality of horizontally disposed filter cake bearing filters vertically spaced one from the other thereby removing the materials from the liquid and accumulating the materials on the filter cake, discharging the liquid clarified thereby from a discharge outlet, interrupting the passing of unclarified liquid through the filter and the discharging of the clarified liquid in response to accumulating a predetermined amount of material on the filter cake, pressurizing the filter chamber forcing liquid remaining in the chamber through the filters, pressure draining liquid through the filters from the filter chamber, interrupting the pressure draining of liquid from the filter chamber by passing the pressurizing medium through the uppermost filter, drying the uppermost filter cake by passing the pressurizing medium therethrough, interrupting the passing of pressurizing medium through the uppermost filter, re-pressurizing the filter chamber forcing liquid remaining in the chamber through the lower filters, pressure draining the liquid through the lower filters from the filter chamber, interrupting the pressure draining of liquid from the filter chamber by passing the pressurizing medium through the adjacent vertically spaced filter, drying the filter cake of the adjacent vertically spaced filter by passing the pressurizing medium therethrough, interrupting the passing of the pressurizing medium through said adjacent filter, pressurizing the filter chamber forcing liquid remaining in the chamber through the remaining lower vertically spaced filters, and continuing the sequential steps of pressurizing the filter chamber, pressure draining the remaining liquid, interrupting the pressure draining, drying the filter cake and interrupting the passing of the pressurizing medium through the dried filter cake until the filter cake on the lowermost of the vertically spaced filters has been dried.

14. The method of claim 13 wherein the step of interrupting the passing of pressurizing medium through the filters comprises forming a seal preventing the passing of the pressurizing medium through said filter.

15. The method of claim 13 further including the steps of removing the filter cake from the filter, and conveying the removed filter cake from the filter chamber.

16. Apparatus for removing materials from an unclarified liquid and reclaiming the liquid and/or materials comprising means for passing unclarified liquid through filtration means thereby removing the materials from the liquid and accumulating the materials on the filtration means, a filter chamber comprising a pressurizable container, a horizontally disposed filtration means carried within said filter chamber having a filter cake supported thereby to clarify a liquid passed therethrough removing materials therefrom and a discharge outlet for discharging clarified liquid from said chamber, condition responsive means actuable upon the accumulation of materials by said filter cake to interrupt the passing of unclarified liquid through said filtration means, pressurizing means including a pressurizing medium actuable upon the interruption of the passing of unclarified liquid through said filtration means, for pressurizing said filter chamber to force liquid through said filtration means, said discharge outlet draining the liquid forced through said filtration means by said pressurizing means, and means for terminating the draining of the liquid through said filtration means upon the discharge from said chamber through said filtration means of an amount of liquid sufficient to allow said pressurizing medium to pass through said filtration means thereby effecting drying of said filter cake to facilitate disposal.

17. The apparatus of claim 16 wherein said filtration means comprises a plurality of vertically spaced filters operatively connected to a common discharge outlet.

18. The apparatus of claim 17 wherein said vertically spaced filters comprise a plurality of coaxial hollow discs having an outer surface forming a septum for support of the filter cake.

19. The apparatus of claim 16 further including movable sealing means carried within said common discharge outlet sequentially movable with respect to said filters to form a seal preventing passage of said pressurizing medium through said discharge outlet.

20. The apparatus of claim 16 further including sealing means for terminating the passage of said pressurizing medium through said filtration means.

21. The apparatus of claim 20 wherein said sealing means for terminating the passage of said pressurizing medium through said filtration means comprises an air-tight sealed piston movable to a position terminating passage of pressurizing medium through said filtration means.

22. Apparatus for removing materials from an unclarified liquid and reclaiming the liquid and/or materials comprising means for passing unclarified liquid through filtration means thereby removing the materials from the liquid and accumulating the materials on the filtration means, a filter chamber comprising a pressurizable container, filtration means comprising a plurality of horizontally disposed vertically spaced filters operatively connected to a common discharge outlet carried within said filter chamber having a filter cake supported thereon to thereby clarify a liquid passed therethrough and remove materials therefrom, condition responsive means actuable upon the accumulation of materials by said filter cake to interrupt the passing of unclarified liquid through said filtration means, pressurizing means including a pressurizing medium actuable upon the interruption of the passing of unclarified liquid through said filtration means, for pressurizing said filter chamber to force liquid through said filtration means, discharge means for draining the liquid forced through said filtration means by said pressurizing means, said discharge means being inoperative upon the discharge of an amount of liquid sufficient to allow said pressurizing medium to pass through said filtration means thereby effecting drying of said filter cake, sealing means for terminating the passage of said pressurizing medium through said filtration means, and means for sequentially moving said sealing means within said common discharge outlet in operative communication from the uppermost through the lowermost of said plurality of horizontally disposed vertically spaced filters in response to the passage of pressurizing medium thereby sequentially terminating the passing of said pressurizing medium to effect draining of said filter chamber.

23. The apparatus of claim 22 wherein said condition responsive means actuable upon the accumulation of materials by said filter cake to interrupt the passing of unclarified liquid through said filtration means comprises a pressure-sensitive switch actuable upon the sensing of a predetermined pressure drop across each filter.

24. The apparatus of claim 22 further including means for removing said filter cake from said filtration means comprising brush means positioned in contact therewith for removing the filter cake from said filtration means and conveying it therefrom.

25. The apparatus of claim 24 further including means for moving said filtration means in contact with said brush means.

26. The apparatus of claim 24 further including means for conveying the removed filter cake from said filter chamber comprising scraper means carried within said filter chamber and movable through the contents contained therein to prevent aglomerating of the filter cake material.

27. The apparatus of claim 26 further including means for conveying said removed filter cake from said filter chamber comprising a horizontally disposed auger in communication with said filter chamber, said horizontally disposed auger means advancing the filter cake removed from said filtration means to a discharge valve whereat the filter cake is compressed forming a semi-dry plug thereof.

28. The apparatus of claim 24 further including means for spraying clarified liquid on said filtration means and said means for removing said filter cake to flush residual filter cake material.

29. The apparatus of claim 28 wherein said means for spraying clarified liquid against said filtration means and means for removing said filter cake comprises a manifold having said orifices.

30. The apparatus of claim 22 wherein the bottom of said filter chamber is conically-shaped to facilitate passage of said filter cake from said filter chamber.

31. The apparatus of claim 22 further including a precoat chamber for receiving clarified liquid discharged from said filter chamber, and means for adding a predetermined quantity of filter cake forming material into said precoat chamber to be mixed with the clarified liquid therein.

32. The apparatus of claim 31 wherein said means for adding a predetermined quantity of filter cake forming material comprises a container for holding a quantity of filter cake forming material, a scraper means carried within said container and movable through the contents contained therein to prevent aglomerating, and an auger rotatably carried within said container to remove a predetermined quantity of the filter cake forming material in response to the rotation thereof.

33. The apparatus of claim 31 further including control means for controlling the amount of liquid contained in said precoat chamber and means actuable in response to said control means for adding liquid to said chamber.

* * * * *

UNITED STATES PATENT OFFICE
CERTIFICATE OF CORRECTION

Patent No. 3,957,636　　　　　Dated May 18, 1976

Inventor(s) Kostas Savas Arvanitakis

It is certified that error appears in the above-identified patent and that said Letters Patent are hereby corrected as shown below:

In the Abstract, line 4, "extending" should read -- expending --.

Column 5, line 66, "160" should read -- 168 --.

Signed and Sealed this

Fourteenth Day of June 1977

[SEAL]

Attest:

RUTH C. MASON　　　　　　　　C. MARSHALL DANN
Attesting Officer　　　　　　　Commissioner of Patents and Trademarks